United States Patent Office 3,383,903
Patented May 21, 1968

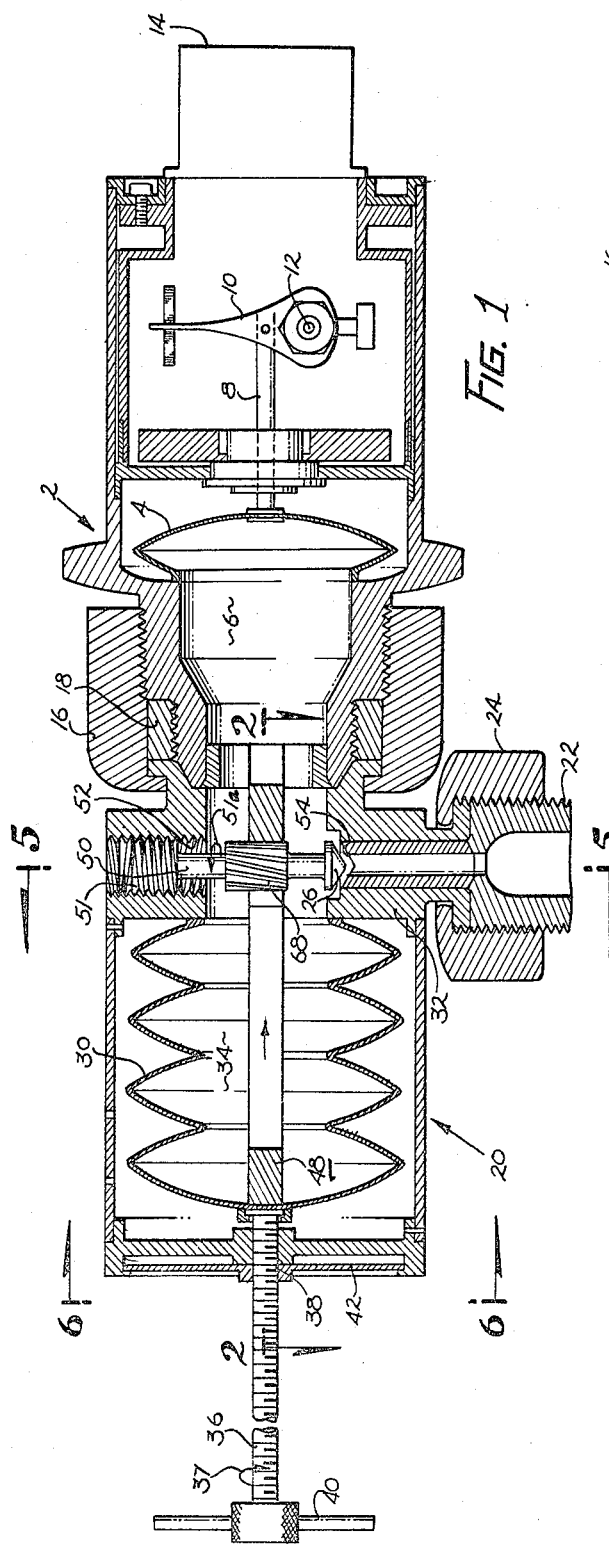

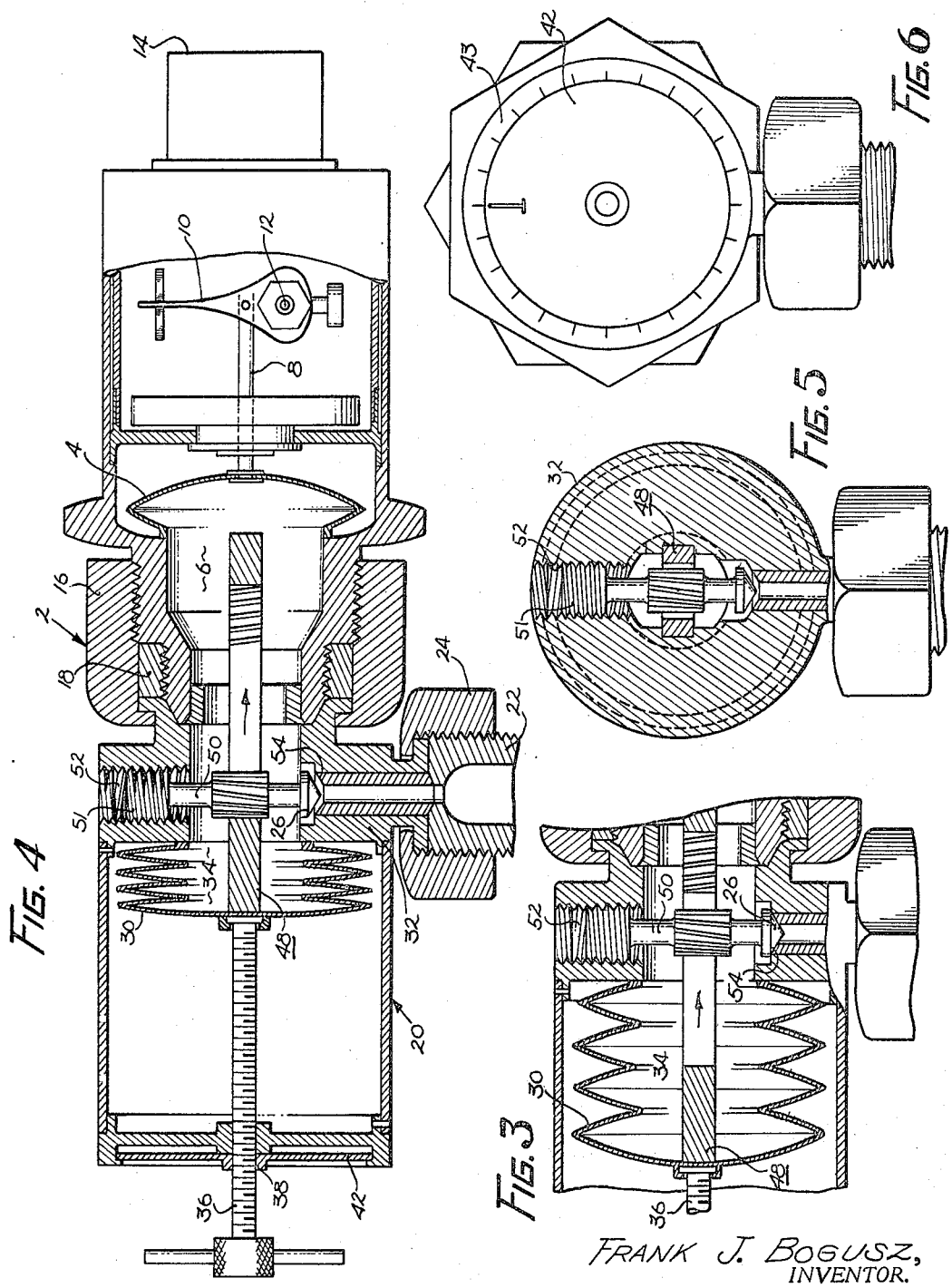

3,383,903
PRESSURE TRANSDUCER CALIBRATOR
James E. Webb, Administrator of the National Aeronautics and Space Administration, with respect to an invention of Frank J. Bogusz, Monrovia, Calif.
Filed Jan. 10, 1966, Ser. No. 578,916
5 Claims. (Cl. 73—4)

ABSTRACT OF THE DISCLOSURE

There is provided a calibrating transducer which may be coupled to a pressure measuring transducer and left coupled thereto while the pressure measuring transducer is functioning. Fluid under pressure which is to be measured, is supplied to both the calibrating transducer and the measuring transducer whereby calibration occurs under actual working conditions.

---

The invention described herein was made in the performance of work under a NASA contract and is subject to the provisions of section 305 of the National Aeronautics and Space Act of 1958, Public Law 85–568 (72 Statute 435; 42 U.S.C. 2457).

This invention relates to a pressure transducer calibrator.

More particularly, this invention relates to a combination of a pressure transducer and calibrator assembly, assembled as a unit.

In the measurement of pressure in fluid systems, it is necessary that a transducer be provided which can sense pressure in a system so as to give a readout therefrom, thus indicating the pressure within the fluid system. In order that the pressure reading be accurate, it is necessary that the transducer be periodically calibrated both before and after pressure readings, particularly over a long period of time. The customary manner in which a pressure transducer is calibrated is to remove the transducer from the fluid system which necessitates removal from the fluid pressure line. The transducer is then calibrated and returned to the fluid system and installed again. This presents problems in that contamination can occur such as by dust or other materials. Also, removal of the system necessitates in many cases the installation of new seals and in any event, the seals are subjected to wear and failure to properly seat.

With the advent of modern space technology, it is often necessary that the pressure transducers in a fluid pressure system be calibrated periodically without danger of contamination and wear on the seals. Also, it is desirable to have a portable and easily operated calibrating system. In addition it is often not feasible or else it is impractical to remove the transducer from the assembly for calibration. In many cases, drift due to many factors can occur, thus rendering the readouts from the transducer inaccurate.

An example of a transducer calibration system is disclosed in U.S. Patent No. 821,988. This, however, is typical of prior art examples in that the transducer or gage must be removed from the system from which it is being used and installed in the test apparatus for calibration.

This invention obviates the disadvantages of the prior art in that the transducer is installed on a fluid delivery line of the fluid pressure system with the calibration system formed therewith as a unit. When it is desired to calibrate the transducer, the transducer can remain in place without the necessity of removal of the transducer or installation of the calibration system and furthermore without interference with the fluid pressure system.

Briefly, the invention comprises a pressure transducer normally in a pressure sensing relationship to sense pressure from a pressure system in which the readout from the transducer is a measure of pressure. Associated with the transducer is a fluid container which is variable in size. A valve is provided which is actuated by the position of the fluid container such that when the fluid container is in its minimum volume position or its maximum volume position, the transducer is subjected to the line pressure. In any intermediate position, the variable volume container will close the valve, thus trapping system pressure within the container which is still exerted on the pressure transducer. By varying the volume of the container, the pressure exerted on the pressure transducer is varied, and since the well-known relationship of pressure times volume remains constant; by varying the volume, the pressure exerted on the transducer can be varied at will. Since the pressure is precisely known, the transducer can be calibrated. The unit is compact, portable and remains in position during use at all times.

Accordingly it is an object of this invention to provide an improved pressure transducer calibrator.

It is another object of this invention to provide an improved method for calibrating a pressure transducer.

Other objects and advantages of this invention will become apparent as this description proceeds taken in conjunction with the drawings in which:

FIGURE 1 is a view partially in cross section of the pressure transducer calibrator constructed according to this invention;

FIGURE 2 is a view partially in cross section taken along the lines 2—2 of FIGURE 1;

FIGURE 3 is another view partially in cross section showing the inlet valve in a closed position and with the valve actuating rod intermediate its extended and seated positions;

FIGURE 4 is a view similar to FIGURE 1 but with the variable bellows container approaching its fully compressed position;

FIGURE 5 is a view partially in cross section as viewed along lines 5—5 of FIGURE 1; and FIGURE 6 is an end view as viewed along the line 6—6 of FIGURE 1.

Referring now to FIGURE 1, there is shown a cross-sectional view of the apparatus constructed according to this invention. Designated generally at 2 is the transducer assembly which includes a pressure sensing capsule 4. This capsule when pressurized in region 6 will move rod 8 to the right. This rod 8 will in turn pivot potentiometer 10 about pivot point 12. While this transducer is illustrated as a potentiometer, other types of transducers can be used such as strain gauges and the like. In any event, the transducer itself is not a part of this invention. Although not shown, electrical leads will emanate at 14.

Transducer assembly 2 is connected by means of collar 16 and connector 18 to transducer calibrator assembly 20. This assembly in turn is connected to a fluid pressure delivery line 22 by means of connector 24. Thus, fluid pressure exerted through line 22 will pass upwardly past valve 26 which as illustrated in FIGURE 1 is in the open position. This fluid pressure will be exerted on transducer or pressure sensing capsule 4. In the transducer calibrator assembly, bellows 30 is shown which is secured at the right end to housing 32. Thus, fluid pressure exerted through line 22 will be exerted both in space 6 and space 34 formed by bellows 30 which together forms a complete container.

A manual drive rod 36 is shown which is threaded so as to be movable in or out of housing 20 which has contained therein complementary threads 38. When manual screw 36 is turned by any convenient means such as handle 40, bellows 30 will be moved in and out thus changing the volume. By providing a vernier 42, the exact position of manual drive screw 36 can be readily determined so that depending upon the position of screw 36, the volume of bellows can be readily ascertained. A vernier scale 43 can be provided as more clearly brought out in FIGURE 6.

A valve actuating rod 48 is shown and as more clearly brought out in FIGURE 2 the operation thereof will become apparent. A rod guide (see FIGURE 1) is indicated at 50 and has threads 51 thereon so as to be movable up or down when rotated through threads 52 in housing 32. Thus, rotation of rod guide 50, up or down, will seat valve 26 on or off seat 54 depending upon the position thereof. Again referring to FIGURE 2, the valve actuating rod comprises an end 60 and end 62 with a slot 64 cut therein. At one end thereof are teeth 66 which when in the fully retracted position of rod or screw 36 will engage gear member 68 of rod guide 50 so as to turn rod guide 50. Likewise, gear teeth 70 are provided at end 62 of valve actuating rod 48 so as to likewise turn gear portion 68 of rod guide 50. When manual drive 36 is in the fully retracted position as shown in FIGURE 1 and then turned in the direction of arrow 37, it can be seen that teeth 66 will drive gear 68 of rod guide 50 in the direction of arrow 51a. Valve 26 will then move downwardly and be seated on seat 54, thus closing off pressure delivered through line 22 to spaces 6 and 34. When the manual drive screw 36 is further actuated so as to move toward the extended position, valve 26 will remain seated. As the fully extended position is approached, gear 68 will be actuated so that rod guide 50 and valve seat 26 will tend to open. Thus, between the positions of the left end of gear teeth 64 throughout space 64 until contact with gear 70 is made, valve 26 will be seated on seat 54 so as to close the line 22. When teeth 70 are contacted, gear member 68 of rod guide 50 will be rotated so as to open the valve and thus exert pressure from delivery line 22 to the bellows end of the transducer capsule. When the valve is closed, system pressure will be trapped within space 34 and space 6 so that the pressure on transducer 10 will still be exerted which is equal to the system pressure at the time the valve 26 is closed.

FIGURE 3 is illustrative of the valve actuating valve being in an intermediate position with valve member 26 seated on seat 54. FIGURE 4 is illustrative of the valve actuating member being moved to the far right (extended position) so that valve 26 is not seated on valve seat 54 thus admitting pressure to the interior of the bellows and transducer capsule. At the fully extended or retracted position of bellows 30, transducer or pressure sensing capsule 4 will respond to system pressure variations.

FIGURE 5 is another view of the valve and rod guide structure as viewed along the lines 5—5 of FIGURE 1.

The principle of operation of this calibrating device is dependent upon the well-known gas law that given a constant temperature, the pressure multiplied by the volume of a closed system remains constant. Thus, assuming a given volume and pressure in an initial state, a decrease in volume will result in an increase in pressure with the product of the two remaining constant. This principle is utilized in this invention to calibrate the transducer.

In operation, if it is desired to calibrate transducer 10 to levels above a precisely known system pressure delivered through the line 22, manual drive rod or screw 36 will be retracted to the position shown in FIGURE 3. By reading the vernier 42, the volume of the total fluid contained within 34 and 6 will be known. When screw 36 is rotated to the right so as to compress bellows 34, valve 26 will close on seat 54 thus trapping system pressure within volumes 34 and 6. By further moving screw 36 to the right as viewed in FIGURE 1, the volume of bellows 34 will decrease. This decrease in volume will result in an increase in pressure on sensing capsule 4 thus actuating transducer 10. Since volume of 34 and 6 is known for the different positions of screw 36 as viewed on vernier 42, the precise pressure exerted on capsule 4 is known and thus the reading of transducer 10 can be calibrated precisely.

The pressure volume relationship in its simplest form is $P_1V_1 = P_2V_2$ where:

$P_1$ = system pressure delivered through line 22
$V_1$ = original volume of space 34 plus space 6
$P_2$ = pressure in spaces 34 and 6 at a different volume determined by position of rod 48

Thus, assuming a trapped known system pressure $P_1$ with valve 26 closed, and volumes 34 and 6 known, a decrease in volume of 34 and 6 from a ratio of 1 to ¾ will increase pressure from a ratio of 1 to 4/3. By incremental known decreases in volume, the incremental increases in pressure will likewise be known and the readings of transducer 10 correlated therewith. Any discrepancies can be corrected so that transducer 10 will be accurate.

In a similar manner, if it is desired to have calibration readings below the previously known system pressure, valve guide or screw 36 is moved to its fully extended position as shown in FIGURE 4. This allows full system pressure to be brought to bear within cavities 34 and 6. When the valve actuating rod 48 is retracted by rod screw 36, valve 26 will seat on 54 thus trapping the fluid pressure exerted by the system through line 22. By turning valve screw 36 to the left, volume 34 will increase thus resulting in a pressure decrease exerted on bellows capsule 4. By calibrating the points as read off vernier 42 and correlating this with pressure, transducer 10 can be calibrated in the same manner as previously described with pressure readings lower than the original system pressure.

Thus, it can be seen by this invention that a portable, permanently installed pressure calibrator is provided which can calibrate pressure transducers through ranges both below and above a given system pressure without intterefering with the fluid pressure system.

Having described this invention, it is to be understood that it is to be limited only by the scope of the claims appended hereto.

What is claimed is:

1. In a system having fluid pressure and a transducer for measuring said pressure from an inlet to said system, that improvement which comprises;
   valve means adapted to close said inlet;
   container means adapted to trap said system pressure when said valve means is closed, said container means having bellows wall means for affording a changeable volume container means;
   control means for changing the volume of said container in known amounts whereby to change the pressure on said transducer in known amounts, for opening said valve means when said container means has a minimum and a maximum volume and for closing said valve means over a predetermined range of volumes of said container means which is between its maximum and minimum value, whereby said transducer can be calibrated.

2. A system for measuring the fluid pressure of a source comprising a pressure measuring transducer having walls defining a chamber with an opening at one side,
   a calibration transducer having moveable walls defining a chamber with an opening at one side,
   first coupling means connecting the chambers of said pressure measuring transducer and said calibration transducer through their openings at one side,
   second coupling means connecting said source of fluid pressure to the chambers of said pressure measuring transducer and said calibration transducer at the region of said first coupling means, said second coupling means including a valve means, and
   a single control means for moving the moveable walls of said calibration transducer for controlling the size of said calibration transducer chamber and for adjusting said valve means, whereby to calibrate said pressure measuring transducer.

3. A system for measuring the fluid pressure of a source as recited in claim 2 wherein the moveable walls of said calibration transducer are in the form of bellows.

4. A system for measuring the fluid pressure of a source as recited in claim 2 wherein said single control means includes screw means,
- means for threadably supporting said screw means for affording motion of said screw means in the direction of its axis as said screw means is rotated,
- means coupling one end of said screw means to the moveable walls at the other side of said calibration transducer opposite the one side having said opening for moving said walls with motion of said screw means along its axis and a valve actuating rod means extending through said calibraton transducer chamber from said side to which said screw means is coupled to said valve means,
- means for coupling said valve rod means to said moveable walls at said other side to be moveable therewith, and
- means coupling said valve actuating rod means to said valve means to adjust said valve means with motion of said valve actuating rod means.

5. A system for measuring the fluid pressure of a source as recited in claim 4, wherein said valve actuating rod means comprises a shaft having an internal slot extending along the length thereof between the end coupled to said moveable walls and the end coupled to said valve means, and
- gear teeth engaging means within said internal slot positioned at both ends and extending part way toward the middle of said slot;
- said valve means including a valve shaft having a valve closure member at one end, a screw thread at its other end and a gear at its center, and
- means threadably supporting said valve shaft with its gear positioned for engagement by said gear teeth engaging means for moving said valve shaft axially as said valve actuating rod means is moved whereby said gear teeth engaging means cause rotation and axial motion of said valve shaft.

References Cited
UNITED STATES PATENTS

| | | | |
|---|---|---|---|
| 2,178,901 | 11/1939 | Webster | 73—4 |
| 3,049,148 | 8/1962 | Richardson | 73—4 |
| 3,065,628 | 11/1962 | Gesell | 73—4 |
| 3,164,979 | 1/1965 | Siegel | 73—4 |

DAVID SCHONBERG, *Primary Examiner.*

LOUIS R. PRINCE, *Examiner.*

N. B. SIEGEL, *Assistant Examiner.*